(12) United States Patent
Göcke

(10) Patent No.: US 11,524,286 B2
(45) Date of Patent: Dec. 13, 2022

(54) METHOD AND METERING DEVICE FOR THE CONTACT METERING OF LIQUIDS

(71) Applicant: Eppendorf AG, Hamburg (DE)

(72) Inventor: Rusbeh Göcke, Hamburg (DE)

( * ) Notice: Subject to any disclaimer, the term of this patent is extended or adjusted under 35 U.S.C. 154(b) by 275 days.

(21) Appl. No.: 16/497,589

(22) PCT Filed: Mar. 28, 2018

(86) PCT No.: PCT/EP2018/058018
§ 371 (c)(1),
(2) Date: Sep. 25, 2019

(87) PCT Pub. No.: WO2018/178202
PCT Pub. Date: Oct. 4, 2018

(65) Prior Publication Data
US 2020/0023350 A1      Jan. 23, 2020

(30) Foreign Application Priority Data
Mar. 28, 2017  (EP) ..................................... 17163424

(51) Int. Cl.
*B01L 3/02* (2006.01)
*G01N 35/10* (2006.01)

(52) U.S. Cl.
CPC ............. *B01L 3/021* (2013.01); *B01L 3/0262* (2013.01); *G01N 35/1016* (2013.01); *B01L 2200/16* (2013.01); *B01L 2300/0832* (2013.01)

(58) Field of Classification Search
None
See application file for complete search history.

(56) References Cited

U.S. PATENT DOCUMENTS

| | | | |
|---|---|---|---|
| 4,917,274 A | 4/1990 | Asa et al. | |
| 5,143,849 A | 9/1992 | Barry et al. | |
| 5,443,791 A | 8/1995 | Cathcart et al. | |
| 6,428,752 B1* | 8/2002 | Montagu | B01J 19/0046 15/320 |
| 6,537,817 B1* | 3/2003 | Papen | B01L 3/0268 134/22.11 |
| 7,201,880 B1* | 4/2007 | Heimberg | B01L 3/0255 101/494 |
| 2001/0049148 A1* | 12/2001 | Wolk | B01L 3/50273 436/180 |
| 2002/0168297 A1* | 11/2002 | Shvets | B01L 3/0268 422/400 |

(Continued)

FOREIGN PATENT DOCUMENTS

| | | |
|---|---|---|
| CN | 101652639 A | 2/2010 |
| CN | 102016597 A | 4/2011 |
| DE | 10 2013 006 227 A1 | 10/2014 |

*Primary Examiner* — Brian R Gordon

(57) ABSTRACT

A method for the contact metering of liquids having the following steps:
a first liquid is introduced into at least one elongate hollow body,
some of the first liquid contained in the elongate hollow body is pressed out of the lower end of the elongate hollow body as a contacting volume such that the contacting volume forms a drop suspended from the lower end of the elongate hollow body,
at least some of the drop is immersed in a second liquid in a target vessel and
the defined metering volume consisting of the contacting volume and a residual volume contained in the elongate hollow body is dispensed into the second liquid.

16 Claims, 10 Drawing Sheets

(56) References Cited

U.S. PATENT DOCUMENTS

| | | | |
|---|---|---|---|
| 2005/0084423 A1* | 4/2005 | Zarowitz | B01L 3/021 |
| | | | 422/504 |
| 2006/0012130 A1 | 1/2006 | Vann et al. | |
| 2007/0109139 A1 | 5/2007 | Wenzig et al. | |
| 2012/0045765 A1* | 2/2012 | Curran | C12Q 1/6806 |
| | | | 435/6.12 |
| 2012/0180579 A1 | 7/2012 | Brady et al. | |
| 2013/0149710 A1* | 6/2013 | Yoon | B01L 7/52 |
| | | | 435/6.12 |
| 2014/0106467 A1* | 4/2014 | Hutter | G01N 35/1016 |
| | | | 436/180 |
| 2015/0238966 A1 | 8/2015 | Berndt et al. | |
| 2016/0202281 A1* | 7/2016 | Fang | B01L 3/50273 |
| | | | 506/10 |
| 2016/0334403 A1 | 11/2016 | Gibbons et al. | |
| 2017/0253914 A1* | 9/2017 | Du | B01L 3/021 |
| 2017/0253915 A1* | 9/2017 | Du | G01N 35/1016 |
| 2021/0229101 A1* | 7/2021 | Li | B01L 3/50273 |

\* cited by examiner

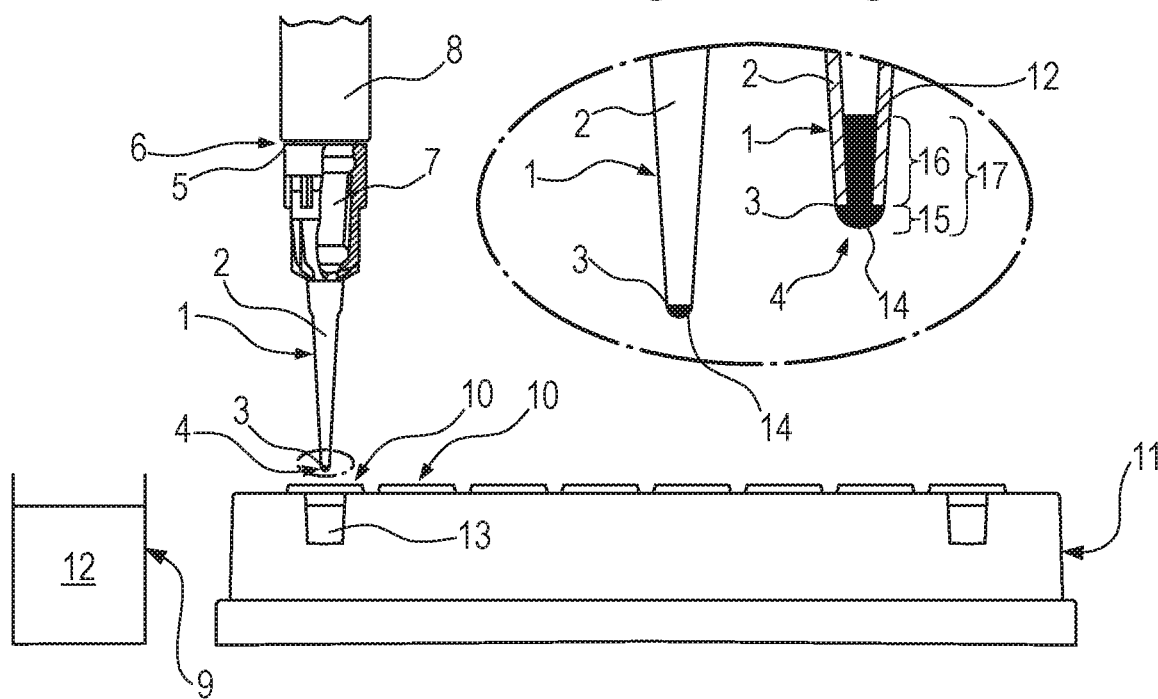
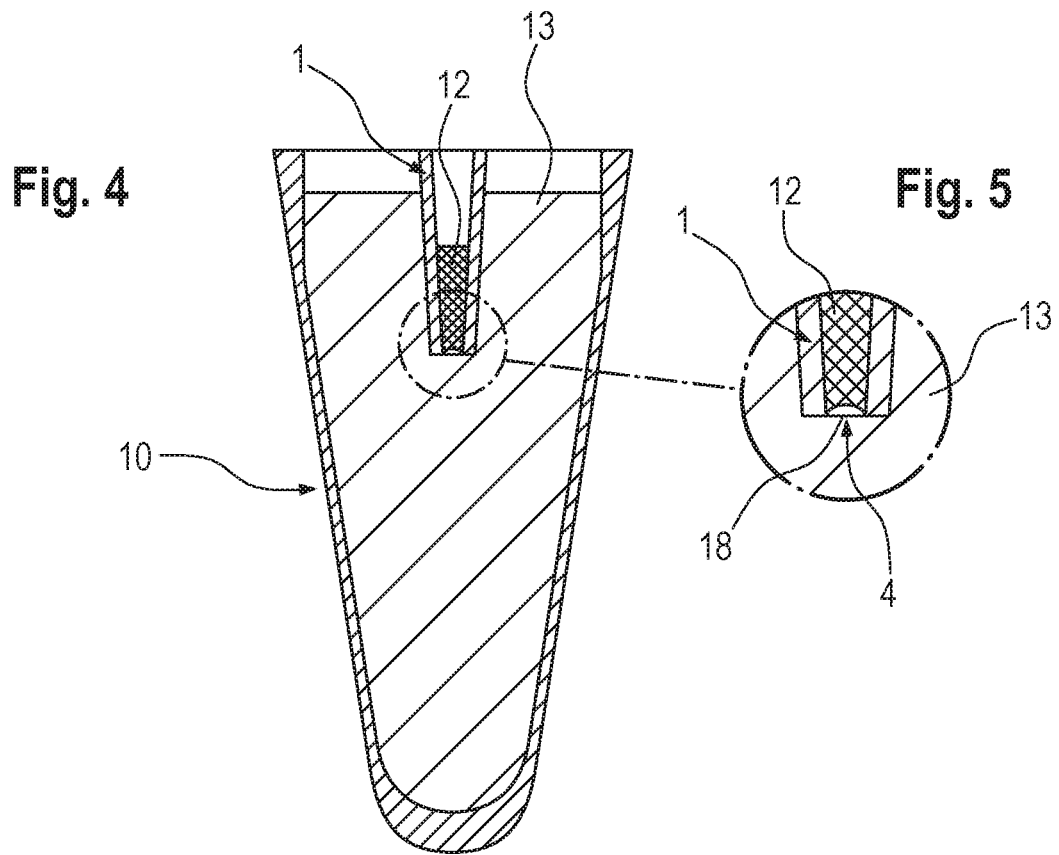

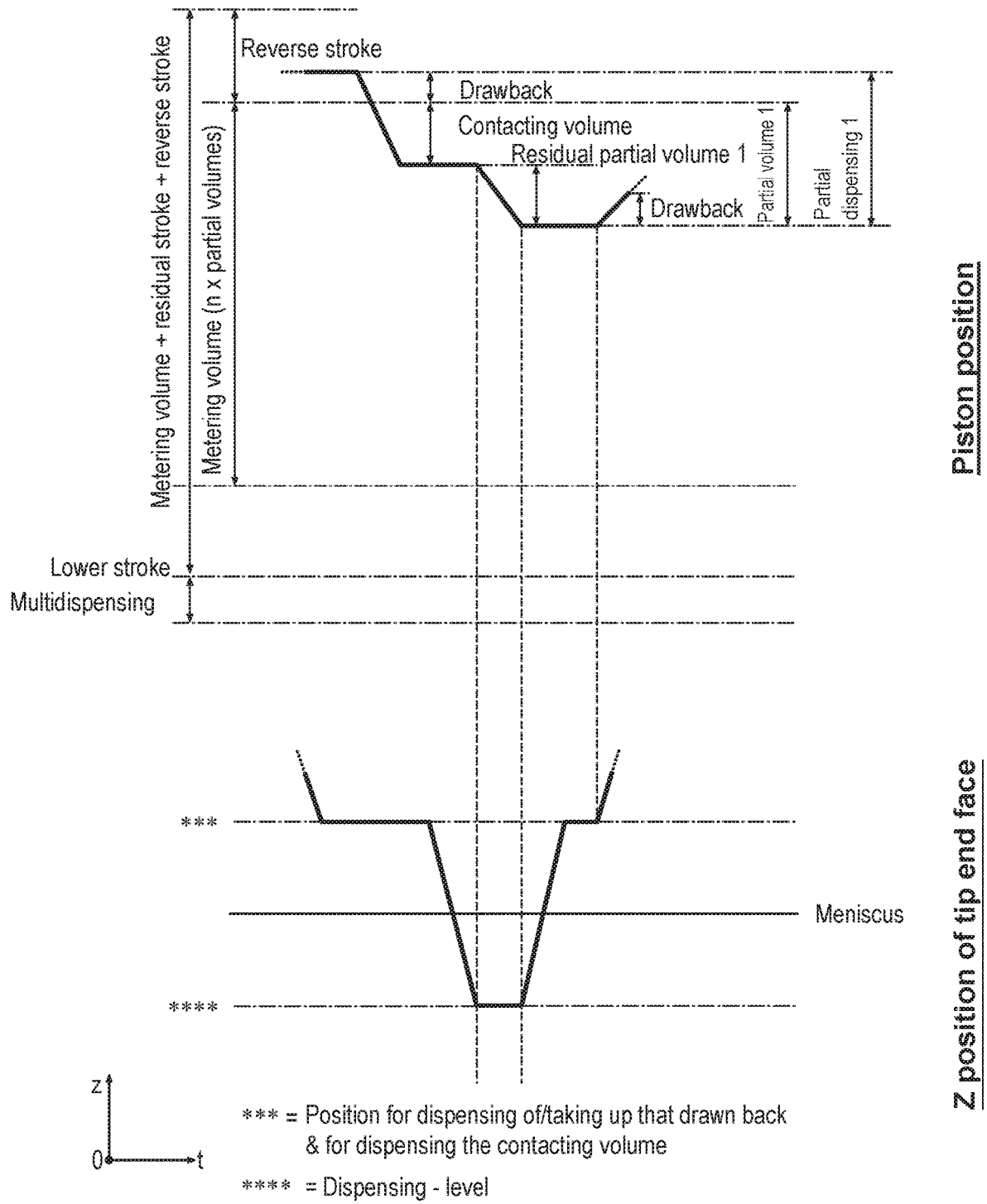

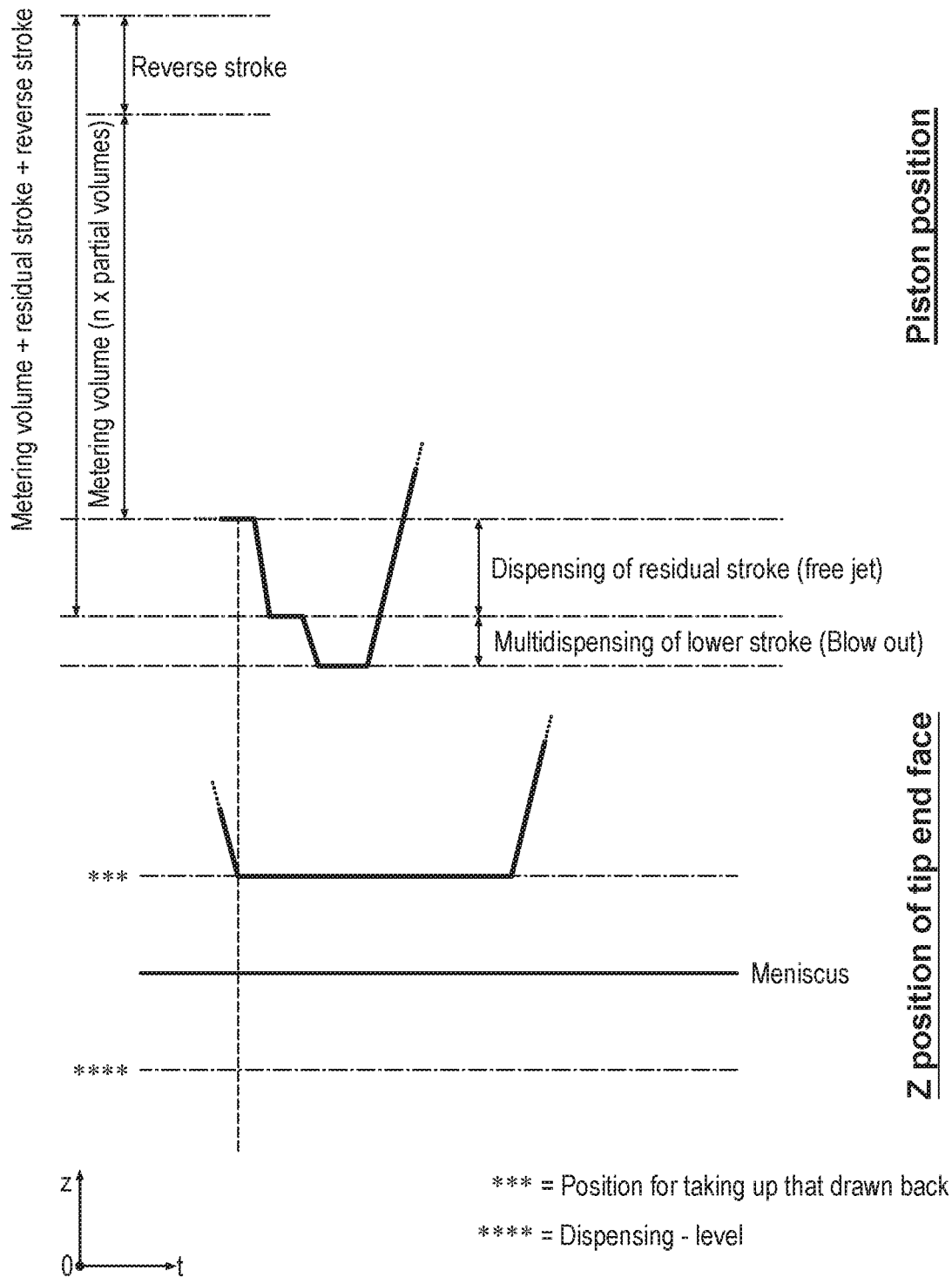

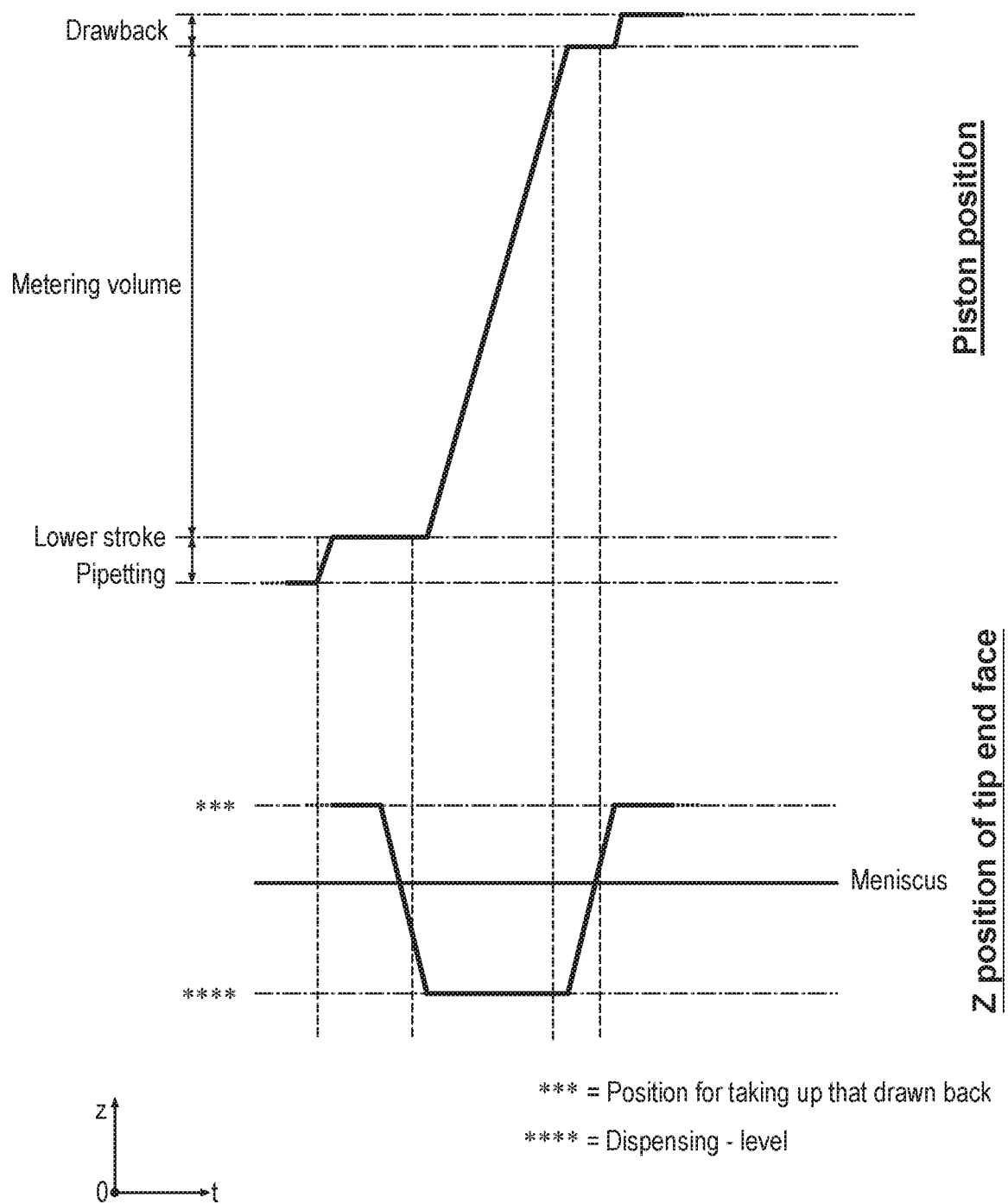

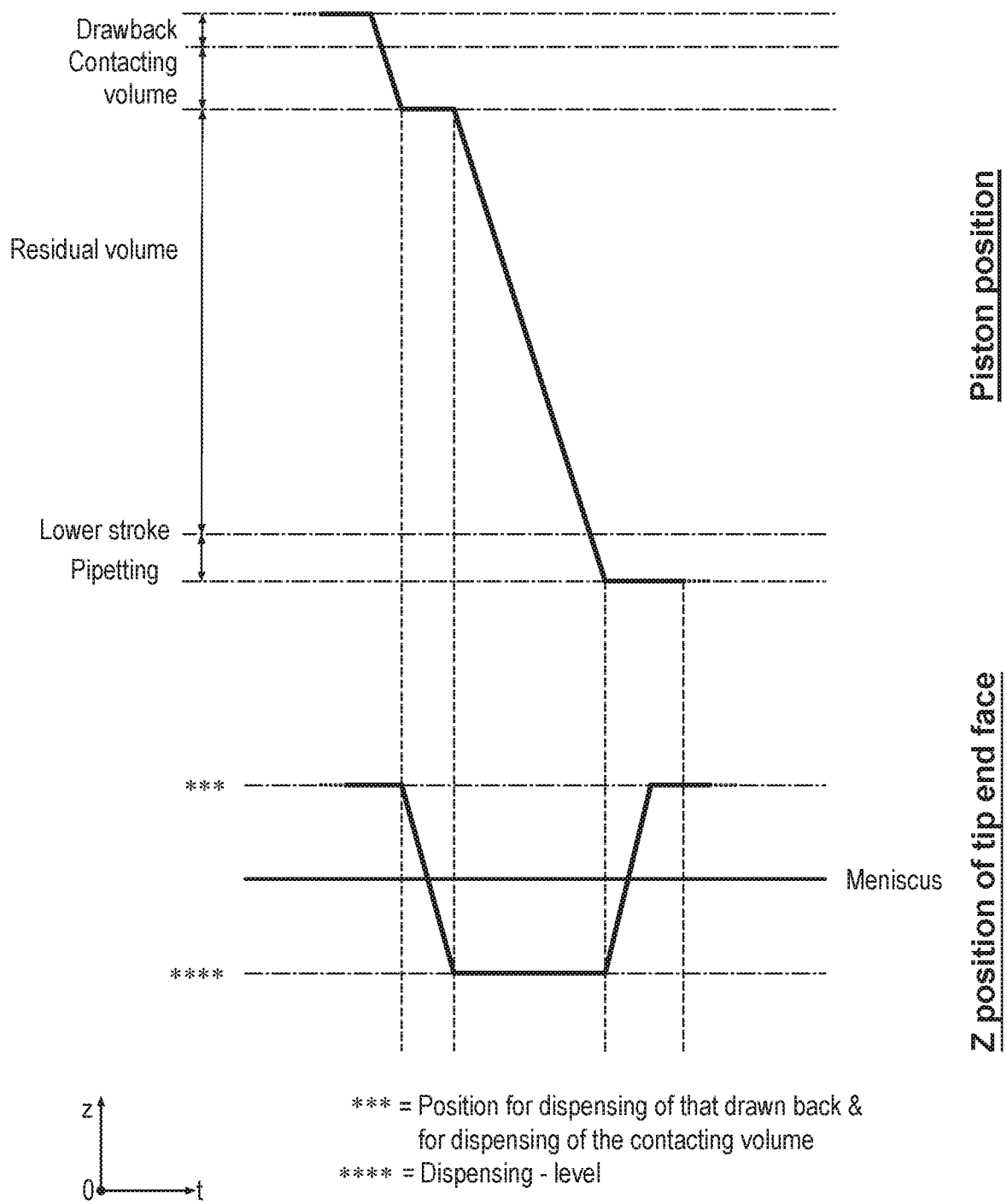

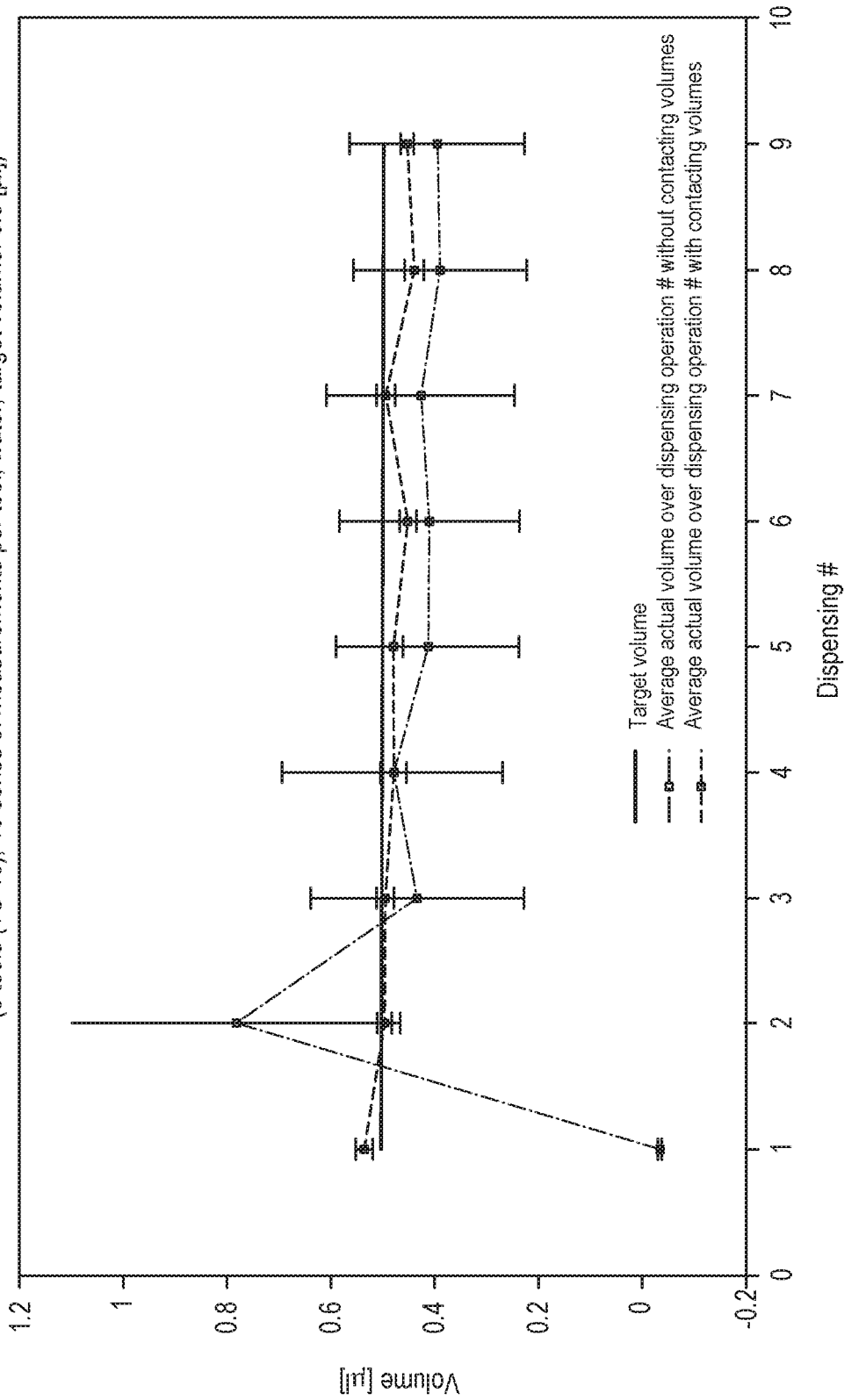

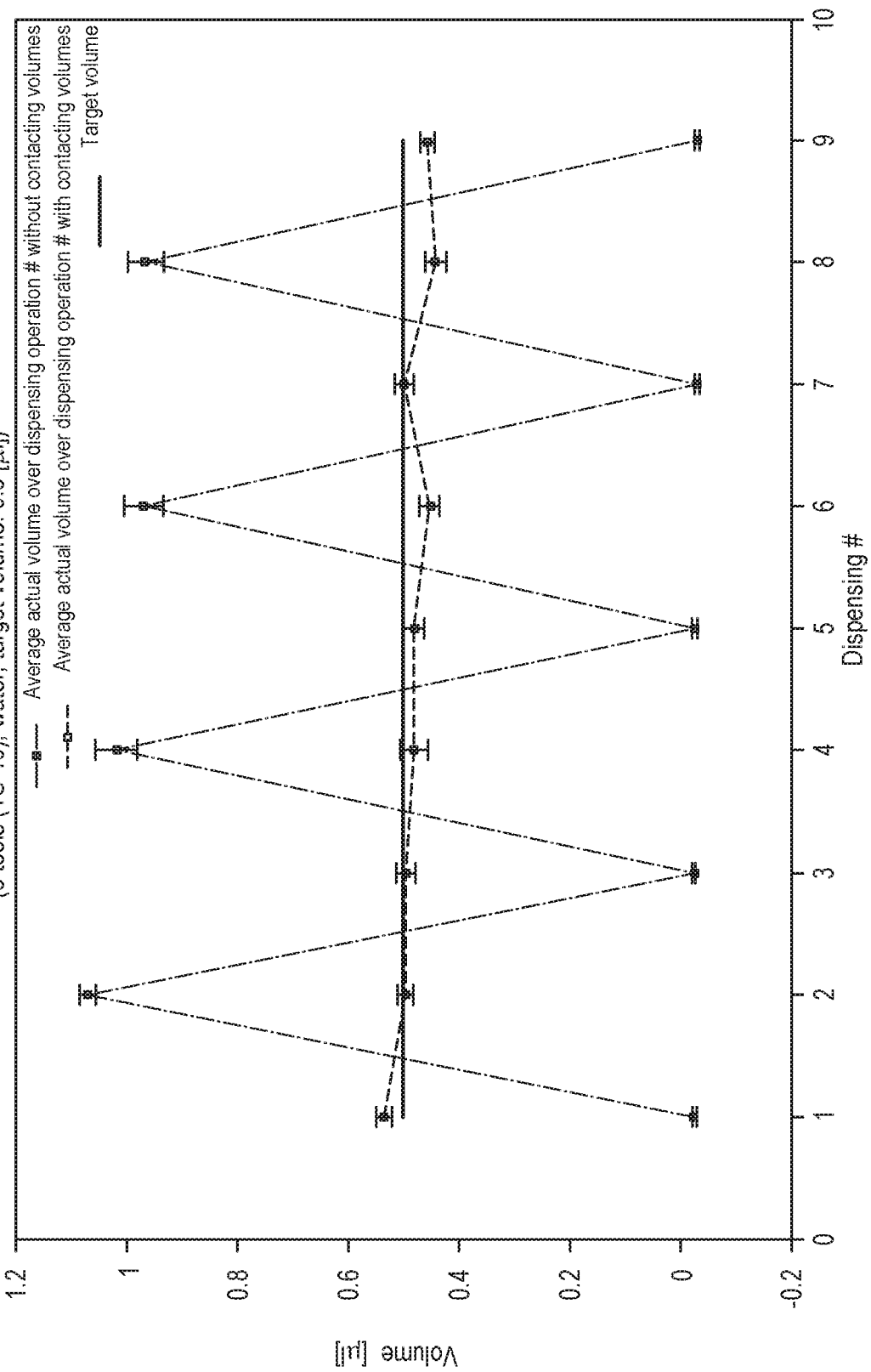

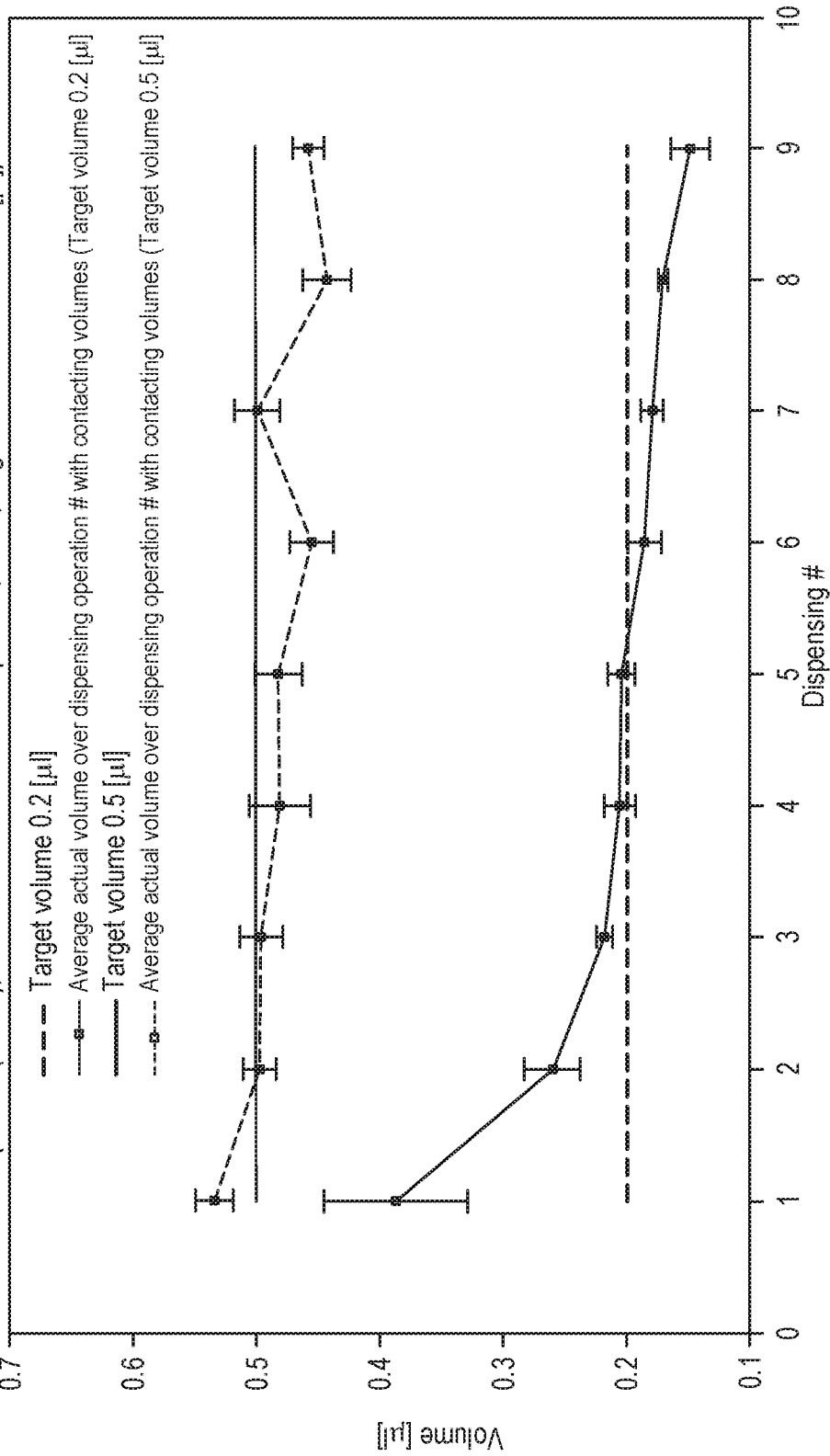

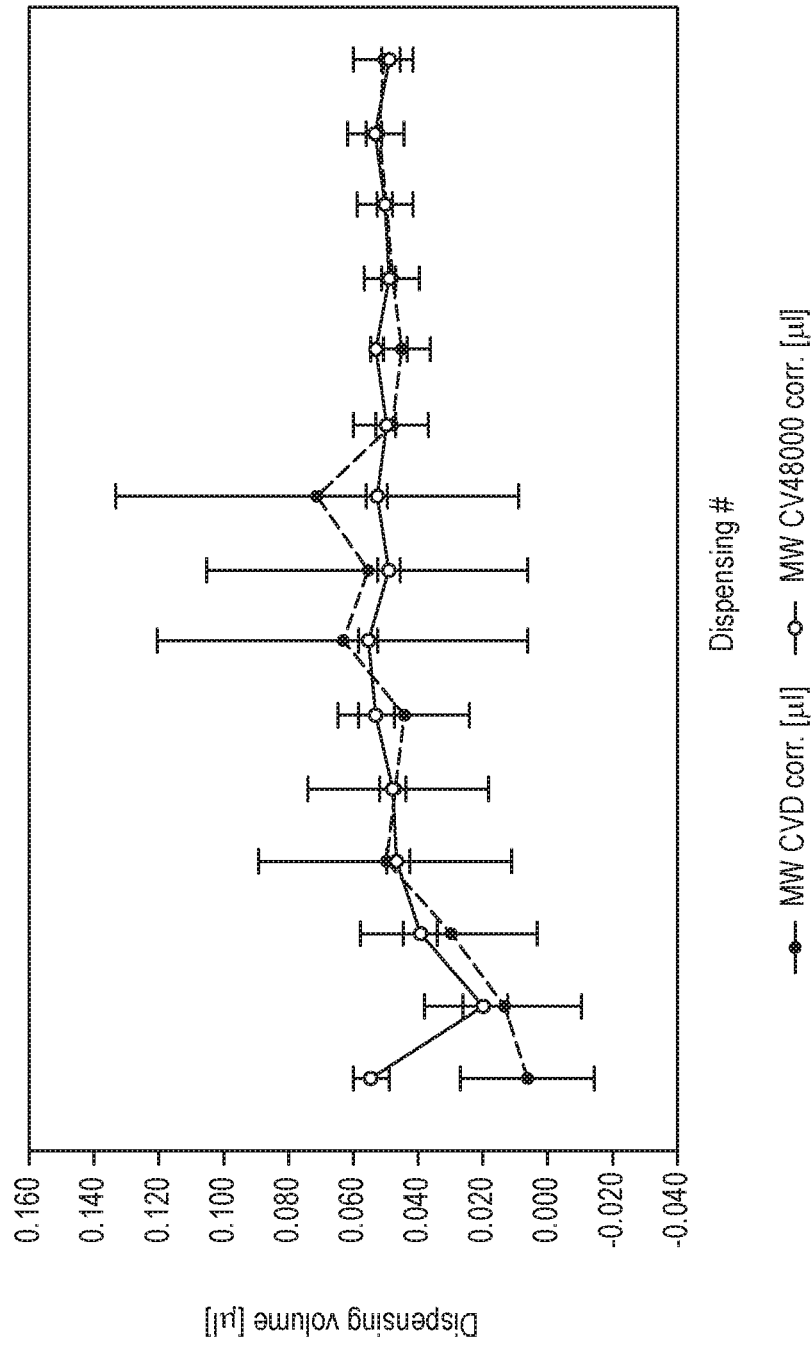

METHOD AND METERING DEVICE FOR THE CONTACT METERING OF LIQUIDS

CROSS-REFERENCE TO RELATED APPLICATIONS

This application is a National Stage of PCT/EP2018/058018 filed on Mar. 28, 2018, the contents of which is hereby incorporated by reference.

FIELD OF THE INVENTION

The invention relates to a method for the contact metering of liquids and to a metering device for the contact metering of liquids.

BACKGROUND

The contact metering of liquids is applied in particular in medical, biological, biochemical and chemical laboratories. During contact metering, a first liquid is taken up into a pipette tip, a cylindrical tube or another elongate hollow body comprising a lower and an upper opening, the elongate hollow body is immersed in a second liquid in a target vessel and the first liquid is dispensed from the elongate hollow body into the second liquid in the target vessel. Preferably, the first liquid is taken from a source vessel by means of the elongate hollow body. For this purpose, the lower opening of the elongate hollow body is immersed in the first liquid and the first liquid is aspirated into the elongate hollow body. Alternatively, the first liquid is fed into the elongate hollow body through the upper opening.

During multidispensing, a first liquid is dispensed in several portions from the elongate hollow body into several target vessels. For this purpose, an amount of the first liquid that is sufficient for being dispensed in several portions into several target vessels can be taken up into the elongate hollow body. During dilution, there are air pockets between portions of the first liquid, such that after each portion of the first liquid is dispensed, a residual amount can be blown out by means of an air pocket. For this purpose, portions of the first liquid and air pockets can be aspirated alternately into the elongate hollow body. During pipetting, the first liquid is dispensed into a single target vessel. In this context, all of the liquid taken up by the elongate hollow body can be dispensed into a single target vessel. As a general rule, the first liquid and the second liquid are different liquids.

Pipette tips are tubes which are held at an upper opening on a metering device and often have a conical shape. Liquid is taken up and dispensed through a lower opening of the tube. Pipette tips made of plastics material can be replaced after use in order to prevent carry-over, for example when alternating between the first and second liquid. Pipette tips made of plastics material are clamped by the upper opening thereof onto an extension piece of the metering device or clamped by the upper end thereof into a blind hole of the metering device. Furthermore, pipette tips made of glass or metal that are intended for reuse are known. Cylindrical tubes made of metal are intended for long-term use and must be cleaned in order to prevent carry-over.

Air displacement systems or positive displacement systems are used to aspirate liquid into the elongate hollow body and eject same back out. In the case of air displacement systems, an air pocket is moved into the elongate hollow body by means of a piston or another displacement apparatus that can be moved inside a cylinder. In the case of positive displacement systems, a piston that comes into direct contact with the liquid in the elongate hollow body is moved inside the elongate hollow body. Pipettes tips having a tube made of plastics material or glass and a piston made of metal or plastics material are known in particular.

When aspirating the first liquid, in addition to the at least one metering volume, a reverse stroke volume and a residual stroke volume are also taken up. After the first liquid has been taken up, the piston carries out a reverse stroke, the reverse stroke volume being returned to the source vessel in a free jet from the elongate hollow body. As a result, backlash in the drive mechanics of the metering device can be prevented, such that it has no influence on the subsequent dispensing of the metering volume. The residual stroke volume is dispensed in a free jet from the elongate hollow body into the source vessel after all of the metering volume has been dispensed. The residual stroke volume ensures that there is a sufficient amount of liquid for the dispensing of the at least one defined metering volume in the elongate hollow body.

Alternatively, the first liquid may be conveyed through the upper opening of the elongate hollow body into same by means of a micropump or another pump or by means of a piston-cylinder unit comprising a cylinder and a piston that can be moved therein.

Contact metering makes it possible to dispense small amounts of liquid in a precise manner. A disadvantage is that, during multidispensing, liquid may be carried over between the target vessels. This disadvantage does not occur with free-jet metering, in which the liquid is dispensed in a free jet from the lower opening of the elongate hollow body into the target vessel without the elongate hollow body being immersed in the second liquid. However, free-jet metering is less precise, in particular in the case of smaller metering volumes.

In contact multidispensing, the level of precision falls sharply below a metering volume of 1 µl, and in contact pipetting, the level of precision falls sharply below a metering volume of 0.2 µl.

US 2012/180579 A1 and U.S. Pat. No. 4,917,274 A describe special geometric configurations of pipette tips for dispensing small metering volumes.

US 2015/0238966 A1 describes a system and method for multidispensing a sample into a buffer liquid for the purpose of analyzing samples in a mass spectrometer by means of electrospraying. In a pressure chamber, a sample is supplied by means of a dispenser while the buffer liquid is being subjected to overpressure when passing from an inflow capillary into an outflow capillary. For this purpose, one dispenser end of the dispenser is arranged in the pressure chamber, such that the sample to be dispensed from the dispenser end can enter the buffer liquid when said buffer liquid enters the outlet capillary. In the process, the sample forms a liquid bridge to the buffer liquid, which enters the inlet end of the outlet capillary. The dispenser end is arranged at a distance from the gap between the inlet capillary and outlet capillary and a drop from the sample liquid grows until it forms the liquid bridge to the buffer liquid. The sample and dispenser are not immersed in the buffer liquid. After formation, the liquid bridge breaks apart and a small residual drop is left on the dispenser.

General Description of the Invention

Proceeding from this, the object of the invention is to provide a method and a device for the contact metering of liquids which allow(s) a considerable reduction in the manageable metering volume and a considerable increase in the level of precision in the case of conventionally manageable metering volumes.

The object is achieved by a method for the contact metering of liquids as described herein.

The method according to the invention for the contact metering of liquids comprises the following steps:

a first liquid is introduced into at least one elongate hollow body, some of the first liquid contained in the elongate hollow body is pressed out of the lower end of the pipette tip as a contacting volume such that the contacting volume forms a drop suspended from the lower end of the pipette tip, at least some of the drop is immersed in a second liquid in a target vessel and the defined metering volume consisting of the contacting volume and a residual volume contained in the elongate hollow body is dispensed into the second liquid.

In the method according to the invention, the defined metering volume (target volume) to be dispensed by means of the elongate hollow body is split into a contacting volume and a residual volume. The contacting volume is pressed out of the elongate hollow body prior to immersion in the second liquid such that a drop suspended from the lower end of the elongate hollow body is formed. Subsequently, at least some of the drop is immersed in the second liquid in the target vessel and the entire metering volume consisting of the contacting volume and residual volume is dispensed into the second liquid. Surprisingly, it has been shown that smaller metering volumes than in conventional contact metering can be managed in this way. That is to say, in the case of contact multidispensing, these are metering volumes below the previously manageable lower threshold of 1.0 µl, and in the case of contact pipetting, these are metering volumes below the previously manageable lower threshold of 0.2 µl. In addition, the precision of the dispensing of metering volumes of 1 µl and above in contact multidispensing or respectively metering volumes of 0.2 µl and above in contact pipetting can be increased.

In a metering device having a displacement apparatus driven by an electric motor and a program-controlled electric control apparatus (e.g., a microcomputer) for controlling the electric drive motor, the method can be implemented easily by programming the control apparatus. Suitable metering devices are known for this. The invention is suitable for existing metering devices that are simply to be retrofitted as well as for new metering devices to be developed.

Internal analyses by the applicant within the scope of the invention have shown that, in the case of conventional contact multidispensing without contacting volumes, in exceptional cases, the volume dispensed alternates between a volume dispensed that is below the metering volume and a volume dispensed that is above the metering volume during successive dispensing. The applicant has identified that, in the case of the alternating lower and higher dispensing volumes, the missing volume of a volume dispensed that is below the metering volume remains as a drop on the lower side of the elongate hollow body and in the subsequent case of a volume dispensed that is above the metering volume, the missing volume is dispensed as an additional volume. The applicant identified the suspended drop as being key to successful dispensing of the metering volume. Upon further consideration of the applicant, the metering volume is split into the contacting volume in the form of a suspended drop and a residual volume contained in the elongate hollow body. The supposition that small metering volumes can be managed and the level of precision with conventional metering volumes can be improved thereby was confirmed in experiments. The causes of the described effect have not yet been definitively clarified. According to the present state of the art, the conventional contact metering of liquid is impaired by the buoyancy force of a bubble left after immersion of the lower opening of the elongate hollow body in the second liquid and by interface effects between the elongate hollow body, the first and the second liquid. The contact metering according to the invention prevents these interfering influences.

In the present application, the term "precision" is used as per the definition given in ISO 35 34-1 and 5725-1.

According to one embodiment of the invention, the first liquid and the second liquid are different liquids. According to another embodiment, the first liquid and the second liquid are the same liquids.

In the present application, the term "liquid" refers to liquid substances and liquid substance mixtures. According to a preferred embodiment, the substance mixtures are solutions. According to another embodiment, the substance mixtures are multi-phase substance mixtures in which one or more phases are liquid. According to another embodiment, the multi-phase substance mixtures are emulsions or suspensions.

The elongate hollow body has a lower and an upper opening, liquid or gas being aspirated or ejected through the lower opening. The terms "lower opening" and "upper opening" are based on the fact that the elongate hollow body is oriented such that the "lower opening" is at the bottom and the "upper opening" is at the top, i.e., arranged higher than the "lower opening", during uptake and/or dispensing of liquid.

In air displacement systems, the upper opening is connected to a displacement apparatus and in positive displacement systems, a piston arranged in the hollow body is moved by means of a piston rod in the hollow body that extends toward or through the upper opening. This embodiment can in particular be used for pipetting, multidispensing or diluting.

According to one embodiment of the invention, the first liquid is introduced into the elongate hollow body by means of the at least one elongate hollow body being immersed by the lower end thereof in a first liquid in a source vessel and the first liquid being aspirated into the elongate hollow body, the volume of the aspirated first liquid comprising at least one defined metering volume, and the elongate hollow body containing the first liquid is removed from the source vessel.

In this embodiment, the method for the contact metering of liquids comprises the following steps:

the lower end of at least one elongate hollow body is immersed in a first liquid in a source vessel, a first liquid is aspirated into the elongate hollow body, the volume of the aspirated first liquid comprising at least one defined metering volume, the elongate hollow body containing the first liquid is removed from the source vessel, some of the first liquid contained in the elongate hollow body is pressed out of the lower end of the pipette tip as a contacting volume such that the contacting volume forms a drop suspended from the lower end of the pipette tip, at least some of the drop is immersed in a second liquid in a target vessel and the defined metering volume consisting of the contacting volume and a residual volume contained in the elongate hollow body is dispensed into the second liquid.

In an alternative embodiment, the upper opening of the elongate hollow body is connected to a piston-cylinder unit comprising a cylinder and a piston that can be moved therein or to another displacement apparatus or to a micropump or another pump, in order to move the first liquid through the upper opening into the elongate hollow body by means of the displacement apparatus or pump. In this embodiment, liquid is introduced into the elongate hollow body through the upper opening. The piston-cylinder unit may also form the reservoir or source vessel for the first liquid. Alternatively, the displacement apparatus or pump is connected to a reservoir or source vessel. In the embodiment of the displacement apparatus as a piston-cylinder unit in particular, it may be possible to connect said unit either to the reservoir or source vessel or to the upper opening of the elongate hollow body by means of at least one switchable valve. These embodiments can in particular be used for pipetting and multidispensing. It is also possible to additionally connect the displacement apparatus or pump to an air inlet by means of at least one switchable valve, in order to alternately dispense portions of the first liquid and air pockets through the elongate hollow body for dilution.

According to another embodiment, the elongate hollow body is a pipette tip. According to a preferred embodiment, the pipette tip is a pipette tip made of plastics material, glass or metal. According to another embodiment, the pipette tip has a conical and/or cylindrical shape. According to another embodiment, the elongate hollow body is a (circular-)cylindrical tube, e.g., made of metal, a capillary, e.g., made of glass, or a hose, e.g., made of silicone or another flexible, preferably resilient, material. According to another embodiment, the (circular-)cylindrical tube has a tip at the lower end, for example to penetrate a vessel cover. This embodiment is also referred to as a "hollow needle". Cylindrical tubes, e.g., made of metal, are fastened to the metering device by means of screwing, for example, and may have an outer thread on the upper end for this purpose. According to another embodiment, the elongate hollow body is a pipette tip made of plastics material, glass or metal, and the piston is a piston made of plastics material or metal.

According to a preferred embodiment, the source vessel is a reservoir, reagent vessel or a microtiter plate or a cuvette. According to a preferred embodiment, the target vessel has a cavity which is enclosed at the bottom and on the sides by at least one wall. The target vessel has a vessel opening at the top, through which the elongate hollow body can be inserted lower end first. The target vessel is designed such that the second liquid introduced therein cannot escape if the vessel opening is arranged at the top. During contact metering, the target vessel is filled with the second liquid, the second liquid resting at the bottom on the base wall and being surrounded at the sides by the side wall. The drop suspended from the lower end of the elongate hollow body is immersed in the second liquid from above through the vessel opening. It is either only the drop that is immersed, partially or completely, in the second liquid, or the drop and the lower end of the elongate hollow body are immersed in the second liquid. According to a preferred embodiment, the drop or the drop and the lower end of the elongate hollow body are immersed in the second liquid by means of the elongate hollow body being moved downward. According to a preferred embodiment, the target vessel is a reagent vessel or a microtiter plate or a cuvette.

According to another embodiment, the first liquid is introduced into the elongate hollow body multiple times and is dispensed again, subsequently the first liquid is introduced once more and after several predispensing volumes, which each correspond to the defined metering volume, have been dispensed in the same way as the defined metering volume is dispensed, the defined metering volume is dispensed into the second liquid at least once.

In this embodiment, the elongate hollow body is conditioned for metering a defined metering volume by means of the previous repeated filling and emptying. According to another embodiment, the volume introduced into the elongate hollow body for conditioning same corresponds to the defined metering volume or to the sum of the defined metering volumes that is/are intended to be metered, optionally including an additional residual dispensing volume. According to a preferred embodiment, for this purpose, the first liquid is introduced into the elongate hollow body from a source vessel or reservoir and returned to the source vessel or reservoir multiple times. According to a preferred embodiment, this is carried out four or five times, or more. According to another embodiment, for this purpose, the lower end of the elongate hollow body is immersed in the first liquid in the source vessel, and the first liquid is aspirated into the elongate hollow body and then ejected into the source vessel again.

By repeatedly dispensing the predispensing volume, the inaccuracies observed during the first multidispensing steps of contact multidispensing are prevented. The volume of the predispensing volume corresponds to the defined metering volume. In addition, the predispensing volume is dispensed in the same way as the defined metering volume, in that a contacting volume is initially formed in the form of a drop suspended from the lower end of the elongate hollow body, at least some of the drop is immersed in the first liquid and the defined predispensing volume consisting of the contacting volume and a residual volume contained in the elongate hollow body is dispensed into the first liquid. According to another embodiment, the predispensing volume is dispensed into the source vessel or into a reservoir that contains the first liquid. According to another embodiment, four predispensing volumes, five predispensing volumes or more than five predispensing volumes are dispensed.

According to another embodiment, after conditioning, the lower end of the elongate hollow body is immersed in the first liquid and several predispensing volumes, plus at least one defined metering volume and preferably a residual dispensing volume, are aspirated into the elongate hollow body.

After the predispensing volume has been dispensed, the defined metering volume is dispensed at least once, which defined metering volume in turn consists of a contacting volume suspended from the lower end of the elongate hollow body in the form of a drop and a residual volume contained in the elongate hollow body. A single dispensing operation for the defined metering volume is referred to as pipetting. Dispensing the defined metering volume multiple times is referred to as multidispensing.

According to another embodiment, a residual dispensing volume is discarded from the elongate hollow body by being dispensed into the source vessel or into a reservoir.

According to another embodiment, the first liquid is aspirated into the elongate hollow body, which first liquid comprises at least one defined metering volume, a reverse stroke volume and a residual dispensing volume. The reverse stroke volume is reserved for performing a reverse stroke in order to eliminate any influence of backlash in the drive mechanics of the displacement apparatus of a metering device on the dispensed metering volume. On account of the residual dispensing volume, it is ensured that a sufficient amount of the first liquid for dispensing the defined metering volume is aspirated into the elongate hollow body.

According to another embodiment, prior to aspiration of the first liquid and if the lower end of the elongate hollow body is not immersed in the first liquid, a lower stroke volume of air is aspirated into the elongate hollow body and, after the defined metering volume has been dispensed and after the lower end of the elongate hollow body has been removed from the second liquid, the lower stroke volume of air is blown out of the elongate hollow body in order to remove remnants of the first liquid from the elongate hollow body. This is advantageous in pipetting as well as in multidispensing and dilution.

According to another embodiment, liquid is metered by means of a single elongate hollow body. According to another embodiment, liquid is metered by means of several elongate hollow bodies at the same time, for example, by means of 8, 12, 16, 24, 48 or 96 elongate hollow bodies. Simultaneous metering by means of a plurality of elongate hollow bodies can be carried out by means of multi-channel metering devices. Metering devices comprising metering heads for a plurality of pipette tips or hollow needles are known.

According to another embodiment, the elongate hollow body is moved away from the source vessel and toward the target vessel after taking up the first liquid and the drop on the lower end of the elongate hollow body is formed when the elongate hollow body is closer to the target vessel than to the source vessel. Due to the drop only being formed at this point, when the elongate hollow body is closer to the target vessel than to the source vessel, evaporation of the first liquid and loss of the drop during transportation is counteracted by means of the elongate hollow body. Preferably, the drop is formed on the lower end of the elongate hollow body as close as possible to the point when it is immersed in the second liquid.

According to another embodiment, after the elongate hollow body has been removed from the source vessel, the first liquid is drawn back into the elongate hollow body and subsequently the drop on the lower end of the elongate hollow body is formed. By drawing the liquid back into the elongate hollow body, evaporation of the first liquid and the risk of losing the first liquid during transportation are further reduced.

According to another embodiment, only a single defined metering volume is dispensed. According to this embodiment, the method for pipetting is used. The method may be repeated as many times as desired in order to carry out several pipetting procedures.

According to another embodiment, after the defined metering volume has been dispensed, the elongate hollow body is removed from the target vessel, a drop comprising the contacting volume is formed on the lower end of the elongate hollow body, at least some of the drop is immersed in a second liquid in another target vessel and the defined metering volume consisting of the contacting volume and a residual volume present in the elongate hollow body is dispensed into the second liquid in the other target vessel. According to this embodiment, the method for multidispensing is used. According to a preferred embodiment, a defined metering volume is dispensed from the elongate hollow body into various target vessels multiple times in the manner described.

According to another embodiment, several defined metering volumes and air pockets between said defined metering volumes are aspirated into the elongate hollow body. The defined metering volumes are dispensed as described above with regard to multidispensing, an air pocket being blown out after each defined metering volume is dispensed. As a result, the method for dilution is used.

According to another embodiment, after the defined metering volume has been dispensed, the elongate hollow body is removed from the target vessel, subsequently the elongate hollow body is moved toward another target vessel and the drop on the lower end of the elongate hollow body is formed when the elongate hollow body is closer to the other target vessel than to the target vessel. As a result, the evaporation of the first liquid and the risk of losing the drop during transportation from the target vessel to the other target vessel are reduced. For this purpose, according to another embodiment, the first liquid is drawn back into the elongate hollow body after the elongate hollow body has been removed from the target vessel and before it is moved to another target vessel.

According to another embodiment, the elongate hollow body is moved over the target vessel or the other target vessel and then the drop is formed on the lower end of the elongate hollow body. On account of the drop forming after the elongate hollow body has been arranged above the target vessel, evaporation and the risk of losing the drop are further reduced.

According to another embodiment, the elongate hollow body is stationary during formation of the drop or the elongate hollow body is moved toward the second liquid in the target vessel during formation of the drop. Consequently, the drop can form immediately before being immersed in the second liquid, as a result of which evaporation and the risk of losing the drop are further reduced.

According to another embodiment, the drop and the lower end of the elongate hollow body are immersed in the second liquid in the target vessel or in the other target vessel and subsequently the defined metering volume is dispensed. As a result, the influence of interface effects on the dispensing of the metering volume is further reduced. This allows for a particularly small metering volume and a particularly high level of precision for the metering.

According to another embodiment, the contacting volume is in the range of from 0.5 to 0.001 µl, preferably from 0.2 to 0.05 preferably 0.1 µl.

According to another embodiment, the drop comprising the contacting volume is a sphere or spherical segment, the spherical segment being smaller than a hemisphere, as large as a hemisphere, or larger than a hemisphere. However, in the invention, the drop may also have a shape other than the ideal shape of a sphere or spherical segment or hemisphere. The shape of the drop depends in particular on material properties of the elongate hollow body and on the liquids used.

According to another embodiment, the defined metering volume is 0.01 to 100 µl, preferably 0.1 to 1 µl, preferably 0.2 to 0.5 µl. The invention can be used both within the range of conventionally manageable metering volumes and below the range of conventionally manageable volumes.

According to another embodiment, the elongate hollow body is immersed 0.5 to 5 mm deep, preferably 1 to 4 mm deep, preferably 3 mm deep in the second liquid in the target vessel.

According to another embodiment, the first liquid is moved within the elongate hollow body by moving an air pocket by means of a piston in a cylinder or by means of another displacement apparatus, or by moving a piston that is in direct contact with the first liquid into the elongate hollow body. According to these embodiments, the method can be carried out by means of an air displacement system or by means of a positive displacement system. A lower stroke can also be performed with an air displacement system or positive displacement system in order to take up or blow out a lower stroke volume of air.

In the method, the elongate hollow body, the source vessel and the target vessel are moved relative to one another in order to immerse the elongate hollow body in the source vessel, remove the elongate hollow body from the source vessel, move the elongate hollow body toward the source vessel, immerse at least the drop and optionally carry out further movements.

According to a preferred embodiment, the elongate hollow body is moved, the source vessel and target vessel remaining stationary. According to another embodiment, the source vessel and target vessel are moved, the elongate hollow body remaining stationary. According to another embodiment, the elongate hollow body and the source vessel and/or target vessel are moved.

Furthermore, the object is solved by a metering device as described herein.

The metering device according to the invention for the contact metering of liquid comprises means for carrying out the method as described herein.

The means for carrying out the method are, in particular, a first holding apparatus for holding at least one elongate hollow body (e.g., an extension piece for clamping a pipette tip), a displacement apparatus for liquid (e.g., a piston in a cylinder), an electromotive drive for driving the displacement apparatus (e.g., the piston in the cylinder), an electric control apparatus (e.g., a microcomputer) and an electric power supply (electric voltage supply). According to another embodiment, the electric control apparatus is programmed to control the electromotive drive such that the displacement apparatus can take the first liquid up into and eject it out of the elongate hollow body according to the method.

According to another embodiment, the means for carrying out the method comprise an XYZ robot or another positioning tool comprising a second holding apparatus for holding a metering head of the metering device and/or a source vessel and/or a target vessel, which is connected to the electric control apparatus. The metering head comprises a first holding apparatus and a displacement apparatus. According to another embodiment, the electric control apparatus is programmed to control the XYZ robot or another positioning tool such that the metering head is moved relative to the source vessel and target vessel such that the first liquid can be taken up from a source vessel and dispensed into a target vessel. According to a preferred embodiment, the electric control apparatus is programmed to move the metering head above a work surface such that the first liquid can be taken up from a source vessel positioned on the work surface and dispensed into a target vessel positioned on the work surface.

According to another embodiment, the metering device is an electrically or manually driven manual metering device, an automatic metering device or an automatic laboratory device, said metering device being a single-channel or multi-channel metering device.

The invention is explained in greater detail below based on the accompanying drawings of an exemplary embodiment and on study results.

BRIEF DESCRIPTION OF THE DRAWINGS

In the drawings:

FIG. 1 is a side view of a pipette tip comprising a contacting volume above a microtiter plate;

FIG. 2 shows an enlarged detail of the pipette tip according to FIG. 1;

FIG. 3 shows another enlarged detail of the pipette tip from FIG. 1 in cross-section;

FIG. 4 shows the pipette tip during immersion in a target vessel during conventional contact metering;

FIG. 5 shows an enlarged detail of the pipette tip from FIG. 4;

FIG. 7 is a diagram showing the piston displacement and displacement of the pipette tip plotted against time during dispensing of the first liquid into a target vessel during contact multidispensing with contacting volumes;

FIG. 8 is a diagram showing the piston displacement and displacement of the pipette tip plotted against time during dispensing of a residual dispensing volume into a source vessel during contact multidispensing with contacting volumes;

FIG. 9 is a diagram showing the piston displacement and displacement of the pipette tip plotted against time during uptake of the first liquid from a source vessel during contact pipetting with contacting volumes;

FIG. 10 is a diagram showing the piston displacement and displacement of the pipette tip plotted against time during dispensing of the first liquid into a target vessel during contact pipetting with contacting volumes;

FIG. 11 is a diagram showing the dispensed metering volume in successive metering steps during contact multi-dispensing with and without contacting volumes;

FIG. 12 is a diagram showing the dispensed metering volume in successive metering steps during contact multi-dispensing with and without contacting volumes;

FIG. 13 is a diagram showing the dispensed metering volume in successive metering steps during contact multi-dispensing with contacting volumes for two different target volumes;

FIG. 14 is a diagram showing the dispensed metering volume in successive metering steps during contact multi-dispensing with and without contacting volumes.

DETAILED DESCRIPTION OF THE PREFERRED EMBODIMENTS

Figure 6:
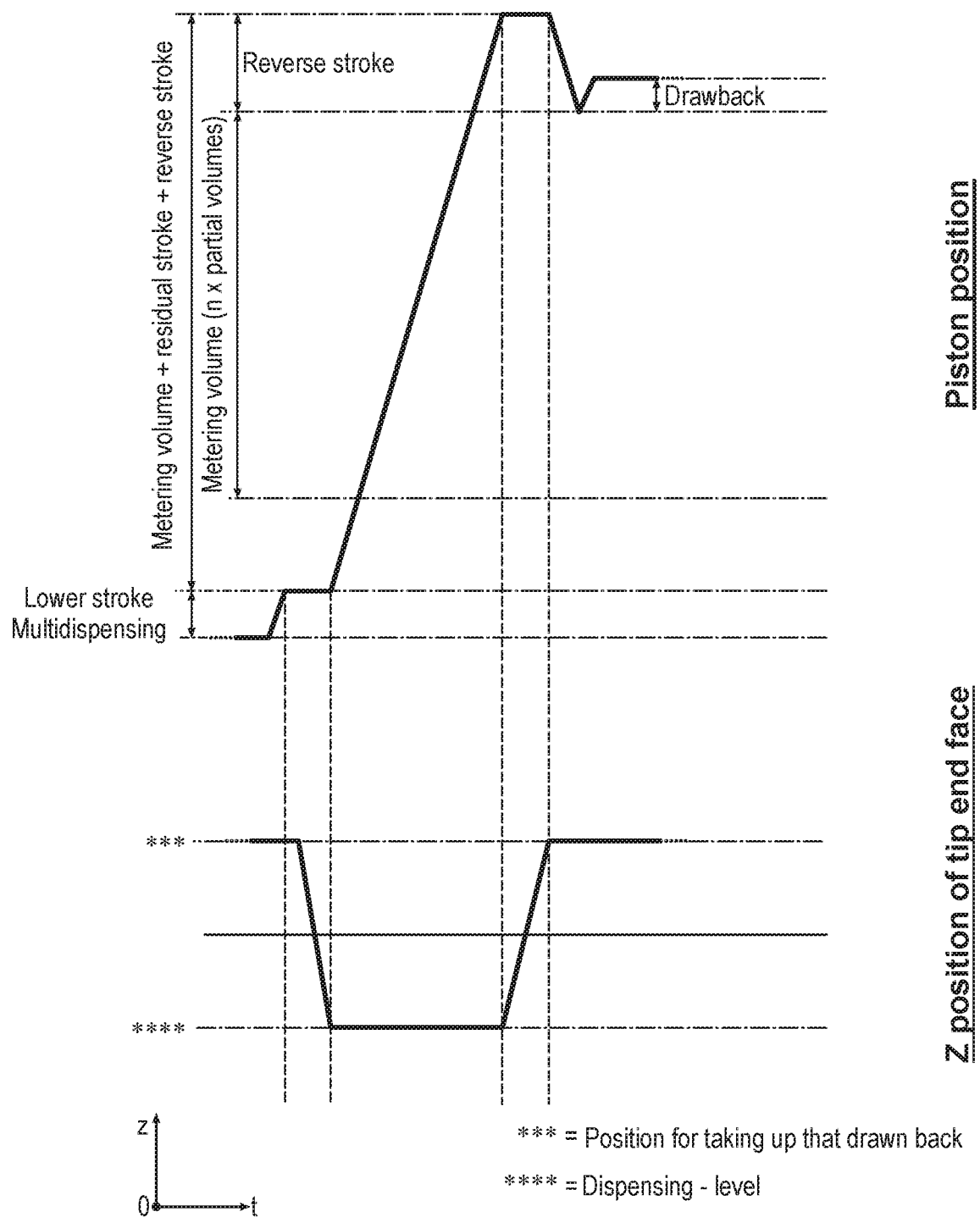
FIG. 6 is a diagram showing the piston displacement and displacement of the pipette tip plotted against time during uptake of the first liquid from a source vessel during contact multidispensing with contacting volumes.

According to FIGS. 1 to 3, the method according to the invention uses a pipette tip 1 made of plastics material. In this case, there is a substantially conical and/or cylindrical tube 2 that has a lower opening 4 on the lower end 3 and an upper opening 6 on the upper end 5, the diameter of which is preferably greater than the diameter of the small opening 4. The pipette tip 1 is clamped on a conical and/or cylindrical extension piece 7 of a metering device 8. The pipette tip 1 is partially cut open in order to show this. In the example, the metering device is a single-channel metering device.

The metering device 8 comprises a displacement apparatus, which is connected to a hole on the lower end of the extension piece 7 via a channel inside the metering device.

The method further uses a source vessel 9 and a target vessel 10. In the example, the source vessel 9 is a reservoir. The target vessel 10 is a well in a microtiter plate 11, the other wells of which form other target vessels.

The source vessel 9 is filled with the first liquid 12 and the second liquid 13 is in the target vessel 10.

In the method, the pipette tip 1 is immersed in the first liquid 12 in the source vessel 9 and then the first liquid is aspirated into the pipette tip 1 by means of the displacement apparatus of the metering device.

An amount of the first liquid is aspirated into the pipette tip 1, which amount of first liquid comprises at least one defined metering volume, one reverse stroke volume and one residual dispensing volume.

Subsequently, by means of the metering device 8, the pipette tip 1 is taken vertically upward out of the source vessel 9 and moved horizontally until it is arranged vertically over a target vessel 10. Subsequently, the pipette tip 1 is lowered by means of the metering device 8 until the lower opening 4 thereof is arranged a short distance above the second liquid 13 in the target vessel 10.

In this position, the pipette tip 1 is stopped briefly and a portion of the first liquid is pressed out of the lower opening 4 of the pipette tip 1 by means of the displacement apparatus such that said portion forms a drop 14 suspended from the lower end of the pipette tip 1. This is shown in FIGS. 2 and 3. The volume of the drop 14 is the contacting volume 15. Furthermore, at least a residual volume 16 remains in the pipette tip 1, which residual volume forms the defined metering volume 17 together with the contacting volume 15.

Subsequently, the lower end 3 of the pipette tip 1 comprising the suspended drop 14 is immersed in the second liquid 13. The immersion depth of the lower end 3 of the pipette tip 1 is 3 mm, for example.

In this position, the residual volume 16 is pressed out of the pipette tip 1 by means of the displacement apparatus such that said residual volume is dispensed into the second liquid 13 together with the contacting volume 15.

Subsequently, by means of the metering device 8, the pipette tip 1 is taken vertically upward out of the target vessel 10 and optionally moved to another target vessel 10 of the microtiter plate 11 in order to dispense additional defined metering volumes 17.

As a result, precise dispensing of small metering volumes under 1 µl and more precise dispensing of metering volumes of 1 µl and above is possible.

In conventional contact metering without contacting volumes, a small bubble 18 appears to remain on the lower end 3 of the pipette tip 1 and settles before the lower opening 4 during immersion of the filled pipette tip in the second liquid in the target vessel. This is shown in FIGS. 4 and 5. Interface effects between the first liquid 12 in the pipette tip 1, the air in the bubble 18 and the second liquid 13 in the target vessel 10 impede precise dispensing of the defined metering volume.

According to FIG. 6, during contact multidispensing with contacting volumes, a lower stroke volume composed of air is initially aspirated if the pipette tip has not yet been immersed in the first liquid. After the pipette tip has been immersed, the piston of the displacement apparatus is moved such that the pipette tip takes up an entire metering volume comprising a number of n defined metering volumes, a residual stroke volume and a reverse stroke volume. Since the pipette tip is immersed in the first liquid in the source vessel, it is arranged below the meniscus on the upper surface of the first liquid.

Subsequently, the piston remains stationary and the pipette tip is taken out of the first liquid.

When the pipette tip is above the meniscus, the piston is moved downward, as a result of which a reverse stroke is performed. In the process, a reverse stroke volume is dispensed in a free jet into the source vessel.

Optionally, the piston may be drawn back by a distance shorter than that of the reverse stroke in order to draw the first liquid into the pipette tip.

The pipette tip filled in this manner is moved to the target vessel. According to FIG. 7, the pipette tip is stopped just above the meniscus of the second liquid in the target vessel and subsequently the piston of the displacement apparatus is moved such that an optionally performed drawback action is reversed and the first liquid is pressed out of the bottom of the pipette tip. The amount of liquid pressed out corresponds to a defined contacting volume. The contacting volume is suspended from the lower end of the pipette tip.

Subsequently, the lower end of the pipette tip is immersed in the second liquid in the target vessel, for example until the lower end is 3 mm below the meniscus on the surface of the second liquid. Subsequently, a residual volume of the first liquid is pressed out of the pipette tip by means of the piston being moved. As a result, a defined metering volume, which consists of the contacting volume and the residual volume, is dispensed into the second liquid.

Subsequently, the pipette tip is taken out of the second liquid until it is above the meniscus of the second liquid. Afterwards, the piston is drawn back slightly in order to draw the first liquid into the pipette tip.

Subsequently, the pipette tip is moved to another target vessel and the procedure shown in FIG. 7 is repeated on the other target vessel.

A partial volume comprising a defined metering volume is therefore dispensed from the pipette tip into each target vessel.

After all partial volumes have been dispensed from the pipette tip, the pipette tip is moved toward the source vessel in accordance with FIG. 8, such that the lower end of the pipette tip is above the meniscus of the first liquid. The piston carries out a residual stroke, as a result of which the liquid remaining in the pipette tip is blown out in a free jet from the pipette tip into the target vessel. Optionally, by means of the piston being moved, a residual stroke volume can also be blown out in order to remove residual liquid from the pipette tip.

According to FIG. 9, during contact pipetting, the pipette tip is initially placed at a distance above the meniscus of the first liquid and the piston carries out a lower stroke.

Subsequently, the lower end of the pipette tip is immersed in the first liquid and a specific metering volume is taken up.

When the metering volume has been taken up, the pipette tip is taken out of the first liquid and stopped above the meniscus. A drawback action is then carried out, as a result of which the liquid is aspirated deeper into the pipette tip.

Subsequently, the pipette tip is moved to the target vessel. The lower end of the pipette tip is stopped above the meniscus of the second liquid and the piston is moved such that the drawback action is reversed and the contacting volume is pressed out of the lower end of the pipette tip in order to form a drop suspended therefrom.

Subsequently, the pipette tip is immersed in the second liquid, for example 3 mm deep. Subsequently, the piston is moved such that the residual volume is pressed out of the pipette tip. As a result, the entire metering volume to be dispensed, consisting of the contacting volume and residual volume, is dispensed into the second liquid. Finally, when the pipette tip is immersed, the lower stroke is reversed. The lower stroke is selected such that a hemispherical bubble forms on the lower end of the pipette tip, which bubble pushes all of the first liquid out of the pipette tip without becoming detached from the pipette tip.

Subsequently, the pipette tip is taken out of the liquid and the pipetting procedure is complete.

Comparative studies were carried out at the headquarters of the applicant in Hamburg for contact multidispensing with and without contacting volumes. An automatic laboratory device epMotion 5075 from Eppendorf AG comprising three structurally identical single-channel metering tools TS-10 was used for this purpose. Eppendorf 10 µl Reload/Standard pipette tips, art. no. 0030014.545, with a nominal volume of 10 µl (automatic machine tips) were used. Water of quality 3 in accordance with DIN 8655, which in turn refers to DIN 3696, was used as both the first and the second metering liquid. The studies were carried out in an air-conditioned laboratory room at a constant temperature and constant relative humidity. WZS 26 HC and WZA 26 NC precision scales were used for the gravimetric determination of the dispensed metering volume. The target vessel was placed on the precision scale. The pipette tip was inserted into the target vessel through an evaporation trap.

Ten series of measurements were carried out with each of the three tools for both the contact multidispensing with contacting volumes and the contact multidispensing without contacting volumes, each series of measurements comprising nine metering procedures, i.e., nine multidispensing steps.

The defined volume to be dispensed (target volume) was 0.5 µl for the comparative measurements with and without contacting volumes.

Three basic patterns were found in the results of the measurements without contacting volumes:

In general, no liquid was dispensed (null metering) during the first metering procedure of a measurement series, there was a metering volume that significantly exceeded the target volume in the second metering procedure of the same measurement series and the metering volume was slightly below the target volume in the subsequent metering procedures of the same measurement series.

In some exceptional cases, an alternation between a volume dispensed that was below the target volume (often a null metering) and a volume dispensed that was above the target volume was observed, the metering volume dispensed in this case being approximately double the target volume.

Correct metering, i.e., the metering volume dispensed was very close to the target volume, took place in only two measurement series.

The measurement series that followed the norm are shown in FIG. 11 and the measurement series belonging to the exceptional case are shown in FIG. 12. The average values of the measurement results during contact multidispensing without contacting volumes are connected to one another by means of dashed lines in FIGS. 11 and 12. Furthermore, the average values of the measurement results during contact multidispensing with contacting volumes are connected to one another by means of dotted lines in both figures. The error bars are shown for all average values. The target volume of 0.5 µl is marked in each case by a solid line.

According to FIGS. 11 and 12, all metering volumes dispensed are more precise in contact multidispensing with contacting volumes than in contact multidispensing without contacting volumes.

Furthermore, in the case of contact multidispensing with contacting volumes, ten series of measurements were carried out with each of the three tools and in each case with a target volume of 0.5 and 0.2 µl. The measurement results are shown in FIG. 13.

The target volume of 0.5 µl is marked by a solid line. The target volume of 0.2 µl is marked by a dashed line.

The average values of the measurement results of the measurement series with a target volume of 0.5 µl are connected to one another by dotted lines.

The average values of the measurement results of the measurement series with a target volume of 0.2 µl are connected to one another by a solid line. The error bars are shown for all average values.

According to this, the target volume of 0.5 µl was accurately adhered to.

In the case of a target volume of 0.2 µl, the metering volume deviated significantly from the target volume in the first metering step and again in the second metering step. In subsequent metering steps, metering was sufficiently precise. This finding can be used in contact multidispensing to discard the first two metering steps and use the metering volumes from the third metering step onward.

Furthermore, a comparison of the measurement results from contact pipetting without contacting volumes with the measurement results from contact multidispensing, in each case with a target volume of 0.2 µl, revealed that the measurement values for metering with contacting volumes were far less scattered than the measurement results of metering without contacting volumes. Therefore, it is also possible to improve the precision of contact pipetting by using contacting volumes.

In the comparative studies represented in FIG. 14, instead of the TS-10 single-channel metering tools, a newly developed tool having a different sensitivity was used, such that the forward movement of the piston could be controlled with higher resolution. Aside from that, the same equipment and test conditions as in the previously described comparative studies were used.

In this comparative study, 40 series of measurements were carried out for both the contact multidispensing with contacting volumes and the contact multidispensing without contacting volumes. In both measurement series, the defined measurement volume to be dispensed was 0.05 µl (50 nl).

In all measurement series of this comparative study, the pipette tips were firstly conditioned in that the first liquid was taken up from a source vessel into the pipette tip and dispensed back into the source vessel multiple times (5×). The volume of the first liquid, which was taken up into the pipette tip and dispensed therefrom in each case, corresponds to the sum of the metering volumes to be dispensed, plus a residual dispensing volume.

Subsequently, the metering volume defined 15 times and a residual dispensing volume were taken up into the pipette tip. The defined metering volume was dispensed into the relevant target vessel and finally a residual dispensing volume was dispensed into the source vessel in each of 15 dispensing steps.

In this comparative study, the extent of evaporation of the liquid from the weighing vessel was determined and the measurement results were corrected accordingly.

In FIG. 14, the average values of the measurement results for contact multidispensing without contacting volumes during the various multidispensing steps are shown by means of black dots, which are interconnected by means of gray lines. The average values of the measurement results for contact multidispensing with contacting volumes during the various multidispensing steps are shown by means of light gray dots, which are interconnected by means of gray lines. The error bars are shown for all average values.

The average values for contact multidispensing without contacting volumes initially deviate significantly from the defined metering volume and only approach same from the tenth metering step onward. The scattering of these measurement results is initially very high and only reduces significantly from the tenth metering step onward.

The average values for contact multidispensing with contacting volumes are relatively close to the defined metering volume from the start and only deviate slightly. From the fifth metering step onward, these measurement results are very close to the defined metering volume. Against this background, according to one embodiment of the method according to the invention, the metering volumes dispensed in the first four dispensing steps are discarded as predispensing volumes, preferably into the source vessel. The subsequent dispensing steps are then regarded as actual metering operations. This comparative study has shown that very small defined metering volumes can also be metered in a precise manner using the method according to the invention.

REFERENCE SIGN LIST

1 Pipette tip
2 Tube
3 Lower end
4 Lower opening
5 Upper end
6 Upper opening
7 Extension piece
8 Metering device
9 Source vessel
10 Target vessel
11 Microtiter plate
12 First liquid
13 Second liquid
14 Drop
15 Contacting volume
16 Residual volume
17 Metering volume
18 Bubble

The invention claimed is:

1. A method for the contact metering of liquids comprising:
introducing a first liquid into at least one elongate hollow body comprising a pipette tip having a lower end,
pressing some of the first liquid contained in the at least one elongate hollow body out of the lower end of the at least one elongate hollow body as a contacting volume such that the contacting volume forms a first drop suspended from the lower end of the at least one elongate hollow body,
subsequently to forming the contacting volume of the first drop, immersing the first drop having the contact volume and the lower end of the at least one elongate hollow body in a second liquid in a first target vessel; and
subsequently to immersing the first drop having the contact volume in the second liquid, pressing a residual volume of the first liquid contained in the elongate hollow body that remains in continuous contact with and along with the contacting volume of the first drop out of the pipette tip, whereby a defined metering volume consisting of the contacting volume and the residual volume contained in the at least one elongate hollow body is dispensed into the second liquid.

2. The method according to claim 1, wherein the introducing of the first liquid into the at least one elongate hollow body comprises immersing the lower end in the first liquid within a source vessel and the first liquid being aspirated or displaced into the at least one elongate hollow body, the volume of the aspirated or displaced first liquid comprising the at least one defined metering volume, and then removing lower end of the at least one elongate hollow body containing the first liquid from the source vessel.

3. The method according to claim 1, wherein the introducing of the first liquid into the at least one elongate hollow body comprises immersing the lower end into, and the retraction of the lower end from, the first liquid within a source vessel a plurality of times and the first liquid being aspirated or displaced into the at least one elongate hollow body said plurality of times, said at least one elongate hollow body holding a predispensing volume during each of said plurality of times, wherein said predispensing volume is equal to the at least one defined metering volume, and wherein each predispensing volume is dispensed by immersing the lower end in the source vessel and dispensing the predispensing volume into the source vessel said plurality of times, and then immersing the lower end into the first liquid within the source vessel and aspirating or displacing the first liquid into the at least one elongate hollow body to hold said at least one defined metering volume, and dispensing said at least one defined metering volume into said second liquid.

4. The method according to claim 1, wherein introducing the first liquid into the at least one elongate hollow body occurs by aspiration or displacement, and said first liquid comprises said at least one defined metering volume, one compensating volume and one residual dispensing volume.

5. The method according to claim 1, wherein introducing the first liquid into the at least one elongate hollow body occurs by immersing the lower end of the at least one elongate hollow body in the first liquid and by aspiration of the first liquid into the at least one elongate hollow body, and prior to aspiration of the first liquid and prior to the lower end of the at least one elongate hollow body being immersed in the first liquid, a lower stroke volume of air is aspirated into the at least one elongate hollow body and, after the at least one defined metering volume has been dispensed into the second liquid, a remnant of the first liquid is removed from the at least one elongate hollow body by blowing out of the lower end the aspirated lower stroke volume of air.

6. The method according to claim 2, wherein following the immersion and prior to said dispensing of said first liquid into said second liquid, the at least one elongate hollow body is moved away from a position adjacent to a source vessel to a position adjacent to the first target vessel after the first drop on the lower end of the at least one elongate hollow body is formed.

7. The method according to claim 2, wherein prior to said dispensing of said first liquid into said second liquid and after the at least one elongate hollow body has been removed from a source vessel, the first liquid is retracted into the lower end and the first drop is formed on the lower end of the at least one elongate hollow body.

8. The method according to claim 1, wherein, after the at least one defined metering volume has been dispensed into the second liquid in the first target vessel, the at least one elongate hollow body is removed from the first target vessel forming a second drop comprising a second contacting volume on the lower end of the at least one elongate hollow body, further wherein, at least a portion of the second drop is immersed in a second target vessel having said second liquid, wherein the at least one defined metering volume including the second contacting volume and the residual volume present in the at least one elongate hollow body is dispensed into the second target vessel.

9. The method according to claim 8, wherein, after the at least one defined metering volume has been dispensed into the first target vessel, and the at least one elongate hollow body is removed from the first target vessel, the at least one elongate hollow body is moved toward the second target vessel and the second drop forms on the lower end of the at least one elongate hollow body upon the positioning of the at least one elongate hollow body closer to the second target vessel than to the first target vessel.

10. The method according to claim 2, wherein after the at least one elongate hollow body is withdrawn from the first liquid, the at least one elongate hollow body is moved over the first target vessel, and the first drop is formed on the lower end of the at least one elongate hollow body over the first target vessel.

11. The method according to claim 2, wherein after the at least one elongate hollow body is withdrawn from the first liquid and the at least one elongate hollow body is moved to a position over the first target vessel, the first drop formed on the lower end remains stationary or is moved toward the second liquid in the first target vessel.

12. The method according to claim 1, wherein the contacting volume is in the range of from 0.5 to 0.001 µl, or in the range of from 0.2 to 0.05 µl, or is 0.1 µl and wherein the defined metering volume is in the range of from 0.05 to 100 µl, or is in the range of from 0.1 to 1 µl, or is in the range of from 0.2 to 0.5 µl.

13. The method according to claim 1, wherein the first drop comprising the contacting volume has a spherical shape.

14. The method according to claim 1, wherein the first liquid is introduced into the at least one elongate hollow body by moving an air pocket by movement of a piston into a cylinder connected to the at least one elongate hollow body or by operation of a displacement device connected to the at least one elongate hollow body, or by moving a piston positioned inside the at least one elongate hollow body.

15. The method according to claim 1,
    said subsequently immersing being performed by manipulating a metering device.

16. The method according to claim 15, wherein said metering device is one of an electrically or manually driven manual metering device, an automatic metering device or an automatic laboratory device, wherein the metering device is a single-channel or multi-channel metering device.

* * * * *